INVENTORS
William J. Williams
Frank T. Cox, Jr.

Dec. 18, 1962 W. J. WILLIAMS ETAL 3,068,964
AUTOMATIC BRAKE ADJUSTMENT
Filed June 17, 1960 2 Sheets-Sheet 2
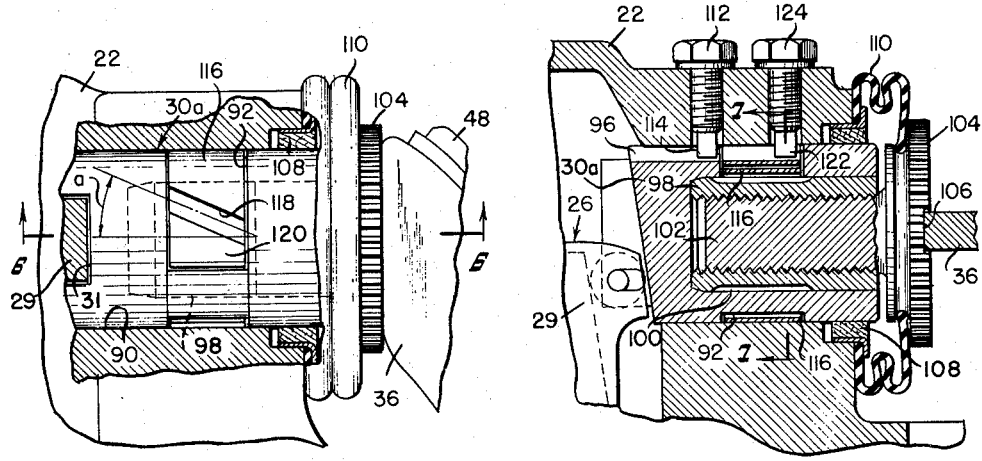
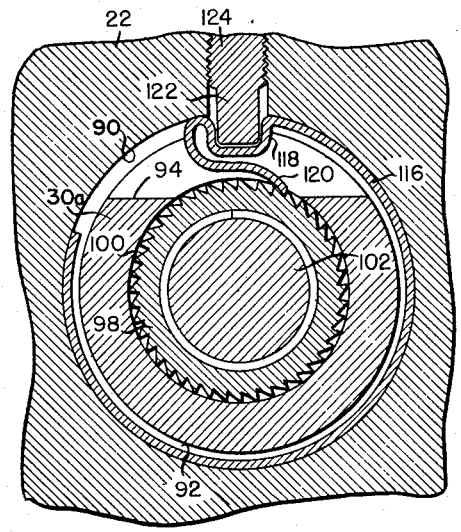
INVENTORS
William J. Williams
Frank T. Cox, Jr.
BY
ATTORNEYS United States Patent Office 3,068,964
Patented Dec. 18, 1962

3,068,964
AUTOMATIC BRAKE ADJUSTMENT
William J. Williams and Frank T. Cox, Jr., Ashtabula, Ohio, assignors to Rockwell-Standard Corporation, Coraopolis, Pa., a corporation of Pennsylvania
Filed June 17, 1960, Ser. No. 36,904
13 Claims. (Cl. 188—79.5)

The present invention refers to automotive vehicle brake mechanism and more particularly to internally expanding shoe type brakes in which brake shoes are moved in opposite directions to frictionally engage a brake drum and is more especially concerned with automatically operated brake shoe adjusting arrangements.

Automatic brake shoe adjusting means have long been proposed to proportionally compensate for brake shoe lining wear. Most of those proposed arrangements have been proven commercially impractical or insufficient mainly because of undue cost, complex or delicate mechanisms requiring constant maintenance or not being dependable in operation, too bulky to fit into the limited space within the modern small diameter brake drum, or for other reasons. Thus the desire for and the problem of automatic brake shoe adjustment persists and the present invention is a novel solution of the problem.

One of the more serious deficiencies inherent in prior devices of this type was the danger of over-adjustment which occurred upon thermal expansion of the brake drum, the adjusters automatically taking up the excessive brake shoe movements during vehicle operation with the result that, when the brake drum has cooled off and contracted, the brake shoes may drag or even seize on the brake drum to cause undue wear and even in extreme cases lock the drum against rotation. In order to avoid this, it is usually necessary to provide sufficient clearance before automatic adjustment takes place to compensate for expansion of the brake drum, but this arrangement is objectionable for reason that it unduly increases the amount of leverage or piston displacement required to apply the brakes.

Accordingly, it is a main object of the present invention to provide an automatic brake adjusting mechanism which is effective independently of expansion and contraction of the brake drum due to temperature changes.

Another object of the present invention is to provide an automatic brake adjusting means for internally expanding shoe type brakes which will automatically maintain a predetermined shoe-to-drum clearance without over-adjusting.

A further object of the present invention is to provide a simple and inexpensive but rugged novel automatic brake adjusting mechanism which can be easily installed as an accessory or orginal equipment on several different types of internal shoe brakes now in general use and which takes up no additional space within the brake drum.

Still another object of the present invention is the provision of a novel automatic brake adjusting mechanism integrally incorporated in the brake actuating mechanism and cooperating therewith. Another object of the invention is to prove a novel automatic brake adjustment wherein a plunger assembly between an actuator and a brake shoe is automatically lengthened as the lining wears.

A still further object of the present invention resides in the provision of a novel brake adjusting mechanism composed of a ratchet stud and spring loaded pawl or dog which automatically acts on retracting movement of the brake shoes to adjust the shoes for lining wear.

Another object of the present invention is the provision of an automatic brake adjusting mechanism adapted to transfer braking torque and in the same instance serves as an anchor for a corresponding brake shoe.

Those and other objects and features of the present invention will become more evident by the following description in connection with the appended drawings in which:

FIGURE 5 is an enlarged fragmentary view similar to part of FIGURE 1 showing another embodiment of the brake adjusting mechanism;

FIGURE 6 is a cross section substantially on line 6—6 through the brake mechanism of FIGURE 5; and FIGURE 7 is a cross section substantially on line 7—7 through the mechanism of FIGURE 6.

Figure 1:
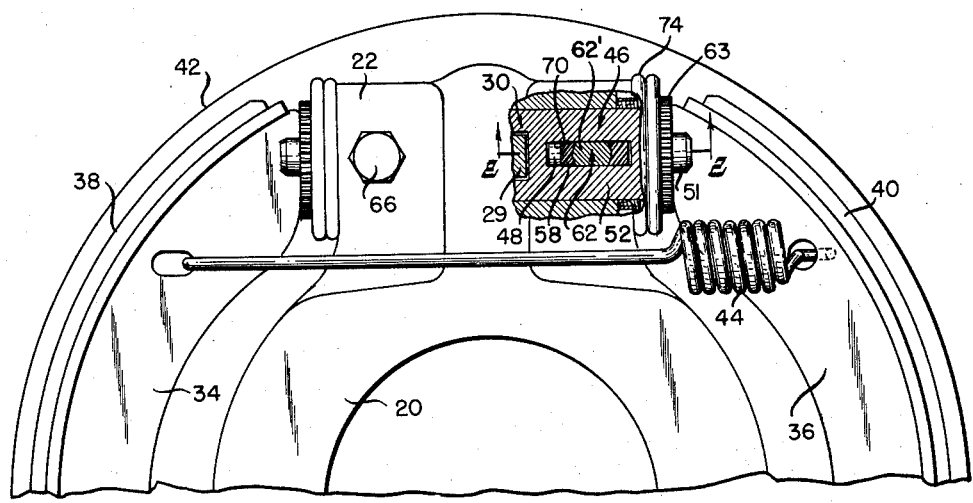
FIGURE 1 is a half plan view of a wedge actuated brake partly in section and showing a preferred embodiment of the present invention.

Although the adjustment mechanism of the present invention will be particularly disclosed as applied to a roller-wedge actuated type brake assembly, it will be understood that it is not limited to that specific brake construction but may be applied to other brake structures incorporating transverse reciprocable plungers or pistons to displace the brake shoes outwardly against the brake drum at either or both ends of the shoes.

With reference to FIGURES 1 to 4 a brake mechanism spider or support plate 20 is rigidly and preferably integrally provided at the actuating end with a brake actuator housing 22 containing a brake actuating mechanism composed of a wedge and roller assembly 26 (FIGURE 2) reciprocably actuated by a fluid motor (not shown) to oppositely displace brake shoe engaging plungers outwardly.

Plungers 30, one for each brake shoe, are transversely reciprocably slidable in housing 22 with their outer ends abutting opposite webs of identical brake shoes 34 and 36 having friction linings 38 and 40 adapted to contact a relatively rotating brake drum 42 when plungers 30 are separably displaced. A return spring 44 extends between and holds the brake shoes 34 and 36 in the released or retracted position and against the plungers 30. Brake shoes 34 and 36 are preferably pivoted at their lower ends (not shown) so that when plungers 30 are displaced away from or toward each other in FIGURE 1 the shoes rock respectively into and out of drum engagement.

Figures 2, 2A, 3, 4:
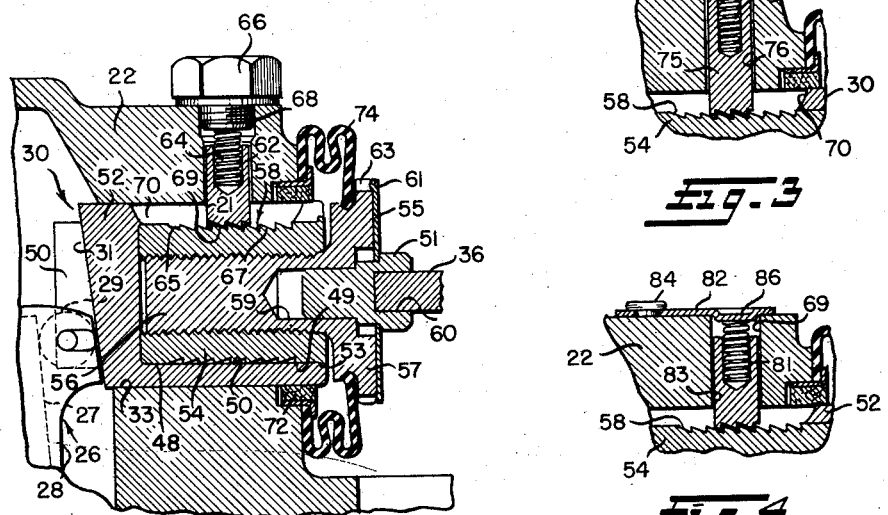
FIGURE 2 is an enlarged fragmentary cross section through part of the brake shoe actuating mechanism substantially along line 2—2 of FIGURE 1.
FIGURE 2A is a fragmentary section showing the slot and holding pawl assembly.
FIGURE 3 is an enlarged fragmentary cross section similar to FIGURE 1 but showing another pawl retaining embodiment.
FIGURE 4 is an enlarged fragmentary cross section like FIGURE 2 showing still another pawl retaining embodiment.

The assembly 26 here comprises a wedge actuator 27 that mounts a carrier 28 on which rollers 29 are disposed in slots permitting lateral shift as the wedge and carrier reciprocate together. As shown in FIGURE 2, which shows one side of the actuator assembly the other side of which is of identical construction with rollers 29 on the other side engaging the plungers 30 of that other side, the forward portions of carrier 29 and the rollers extend into the slotted inner ends 50 of plungers 30 with rollers 29 in rolling contact with inclined faces 31 of plungers 30.

Plungers 30 are cylindrical within a smooth cylindrical housing bore 33, these bores on opposite sides of housing 22 being axially aligned and of the same size. It will be seen that as the wedge assembly 26 moves inwardly in the direction of the arrow in FIGURE 2 it will displace both plungers 30 outwardly.

This particular plunger and reciprocable wedge assembly structure is disclosed in the pending application of Frank T. Cox et al., Serial No. 758,501, filed September 2, 1958, to which reference is made for any further information necessary to understand it.

Plungers 30 may both be actuated in a fixed anchor brake as disclosed in the drawings, or, as in a dual actuated brake where sets of plungers 30 coact with both shoe ends, only one plunger 30 will be actuated whereas the opposite plunger comprises an anchor for either brake shoe 34 or 36. In any event, the present automatic adjusting mechanism, which is generally indicated at 46, is associated only with an actuating plunger, and the full braking torque will be transferred through this mechanism.

The inward movement of each plunger 30 may be arrested by an intermediate abutment (not shown) within housing 22 which is more or less inoperative when the wedge assembly is in position and which does not interfere with action of the wedge assembly. This abutment merely blocks inward sliding of plungers 30 when the wedge assembly 26 is removed.

Each plunger 30 in this instance is composed of an outer cylindrical member 52 and an inner internally threaded nut member 54 rotatively mounted therein, as on cylindrical surfaces 48 and 49 slidably engaged with cylindrical bore 50. Nut member 54 is provided with a small outer end radial flange 53 to prevent reversed end insertion of the nut member into bore 50 during assembly. Screwed into nut member 54 is a threaded stud 56 which is provided outwardly of plunger 30 with a radially enlarged integral star wheel 57. Rotation of nut member 54 moves stud 56 axially outward or inward in relation to the plunger 30.

Stud 56 is formed with a central bore 59 to slidably rotatably receive the shank of a brake shoe retainer 51 provided with an outer end slot 60 into which fits the web of brake shoe 34 or 36 as the case may be. A flat washer type plate spring 55 is securely staked or otherwise fastened to retainer 51 so that its inner side of the assembly abuts the outer surface of the star wheel 57. Spring 55 is provided at one location with an integral projection spring tooth 61 which extends into any one peripheral serration 63 of the star wheel 57 thus normally preventing the shoe retainer 51 from rotation. The spring 55 is held under tension against the flat side of the star wheel 57 by the retracting force of the brake shoe return spring. Upon manual or automatic adjustment, the tension force of spring 55 is easily overcome so that the star wheel 57 can be rotated. The indentation 61 then snaps into an adjoining serration 63 of the star wheel to again lock the shoe retainer 51. This arrangement effectively prevents side movement of the brake shoe and thus reducing the possibility of laterally tapered lining wear.

Nut member 54 is provided circumferentially between its ends with ratchet teeth 58 which extend helically around its outer surface. With reference to FIGURE 2 it will be noted that these teeth provide surfaces 65 that are essentially at right angles to the axis of stud 56 joined by similarly inclined surfaces 67 that diverge outwardly. Teeth 58 of nut member 54 engage with corresponding ratchet teeth 69 of a plunger type pawl 62 which extends radially slidably through a slot 21 in the housing 22 and is held in contact with teeth 58 as by an expansion spring 64 that abuts a screw type plug 66 screwed into a corresponding aperture 68 of housing 22. Plug 66 also seals this aperture and slot against entry of foreign matter.

Plunger 30 is formed with a longitudinally slotted periphery at 70 to pass the inner end of pawl 62. Pawl 62 is preferably flatsided at least at the lower end 62' in slot 70 to prevent the pawl from rotating, and this also prevents rotation of the plunger 30 about its axis.

A seal 72 within the housing 22 at the plunger aperture outer end together with a boot type seal 74 of elastic material cooperating to prevent the entry of foreign matter so that the complete adjusting mechanism is sealingly enclosed to further enhance the efficiency of the adjusting mechanism. Seal 74 is an extensible flexible sleexe fixed at opposite ends to housing 22 and the plunger assembly respectively. Seal 72 slidably engages plunger 30.

FIGURE 3 shows another pawl plunger retaining structure. Here the pawl 75, which is formed at its lower end to fit in slot 70 like at 62' in FIGURE 2A, is radially slidable in a bore 76 of housing boss 77. A spring 78 reacts between the pawl and a disc 79 in the bore held there by a split pin or dowel 80 extending through boss 77.

FIGURE 4 shows still another manner of retaining the pawl in contact with teeth 58. In this embodiment a spring 81 is held compressed by a plate 82 removably secured as at 84 to housing 22 and provided with an indentation 86 extending into the plunger pawl bore 83 to abut the spring 81.

It will be obvious that numerous other equivalent arrangements can be provided to retain the plunger pawl 62 under spring bias within its bore.

When the plungers 30 are displaced slidably by the wedge assembly 26, the shoes 34 and 36 oppositely pivot until they engage the brake drum 42. During this plunger movement the pawl 62 in FIGURE 2, because of its essentially flexible suspension, will ride upon the teeth 58 of the outwardly moving ratchet nut member 54. If no wear has occurred on the brake shoe linings, pawl 62 will not completely disengage from its initial tooth engaging position but only rides up on a single sloping ratchet tooth surface 67 a certain longitudinal predetermined distance equal to the normal brake shoe clearance; that is, the distance the brake shoes have to move from the retracted to the fully applied position. If the plunger movement exceeds this predetermined distance, the teeth 69 of pawl 62 will disengage from their initial position on ratchet nut 54 and engage with the sloping surface 67 of the next adjacent tooth. When the plunger 30 returns upon release of the brake, the ratchet nut member 54 is forced to rotate because of the pawl teeth 69 slidably abutting against the next inward vertical faces 65 of ratchet teeth 58. The pawl 62 cannot now move either radially or longitudinally of plunger 30 and the ratchet teeth 58 are helically disposed, so the ratchet nut 54 must rotate. The direction of the helix of teeth 58 is such that rotating movement of ratchet nut 54 causes stud 56 to be displaced axially outwardly a certain distance because of its threaded connection to the ratchet nut 54. Screw stud 56 can, of course, only move axially because of its slotted connection 60 to the brake shoe web.

The desired adjustment of the brake shoes upon adjustment will be entirely determined by the angle of the helical ratchet teeth 58, the number of teeth on either ratchet nut 54 or pawl 62 and the number of threads per inch in the connection between screw stud 56 and ratchet nut 54. Those values can, of course, be varied to suit individual brake requirements. Increasing the number of teeth on the pawl 62 would provide a very fine minute adjustment which might be desirable in some applications.

FIGURES 5 to 7 illustrate another embodiment of the present invention. Here cylindrical plunger 30a slides in a cylindrical bore 90 and is provided intermediate its ends with a circumferential recess 92 culminating at the top in a flat chordal surface 94 for a purpose to appear. Rearwardly extending from flat surface 94 is a longitudinal plunger recess 96. Inserted into the plunger 30a is a ratchet nut 98 similar to ratchet nut 54 of the foregoing embodiment but instead of a helical teeth section it is peripherally provided with a longitudinal ratchet toothed section 100. Threaded into the ratchet nut 98 is a threaded stud 102 identical to stud 56 and also provided with a star wheel 104 having a lateral slot 106 into which the web of either brake shoe 34 or 36 extends to prevent both the shoe and stud from rotation. A seal 108 and rubber boat assembly 110 prevents the entry of dust, moisture, and other foreign matter into the mechanism.

At its inward end, each plunger 30a is engaged by the wedge mechanism 26 to move outwardly to apply shoes 34 and 36 against the brake drum 42. A flexible spring blade 116 has one end portion curled within recess 92 as shown in FIGURE 7 and is formed within the recess above chord 94 with an outwardly facing channel 118 and then with a spring tooth 120 engaging ratchet teeth 100. The inner end 114 of a removable fixed plug 112 extends into slot 96 to prevent rotation of plunger 30a as it slides. A stop 122 at the inner end of a screw plug 124 in the housing is seated in channel 118 which is disposed at an angle a to the plunger axis. As plunger 30a moves outwardly the entire spring pawl member 116 may be forced to slidably rotate counterclockwise in FIGURE 7 within recess 92 because of the angled recess 118 which is slidably engaged by the point of screw 124. Since the ratchet nut 98 moves axially along with the outer member 30a this combined movement of ratchet nut and spring pawl is such that the pawl 120 will not move circumferentially enough to leave its initial tooth engaging position on the ratchet nut 98 during normal brake application and therefore will not rotate the nut upon return movement of plunger 30a. When the brake lining is worn the plunger 30a has to travel further, exceeding a predetermined distance. In this case, on sufficient outward movement of plunger 30a the spring pawl 120 will disengage and engage the next adjacent tooth on ratchet nut 98. Upon return movement of plunger 30a the ratchet nut 98 will now be rotated a small distance by the pawl 120 because of the advanced position of this pawl. Rotation of ratchet nut 98 advances the screw stud 102 outwardly a certain distance because of its threaded connection with the ratchet nut.

The desired advance of the brake shoes 34 or 36 upon adjustment actuation in this embodiment will be determined by the angle at a of the spring pawl recess 118 and number of teeth on either ratchet nut 98 and/or pawl 120 and the pitch of the screw threads between stud 102 and ratchet nut 98.

In both embodiments of the invention the wedge actuated plunger assemblies, when the wedge is moved inwardly of housing 22, are oppositely displaced to oppositely rock the brake shoes into drum engagement. Should either shoe have greater than a predetermined clearance with the drum, as due to wear, the plunger assembly will be automatically expanded in length. This is accomplished by the ratchet arrangements in the foregoing embodiments, which positively maintain the extended plunger length and it repositions the brake shoes so that always regardless of wear the same plunger stroke effects the same braking action since the shoes are always moved the same amount from disengaged to drum engaged position.

In both embodiments it will be observed that within a small amount of longitudinal movement of the plunger during actuation, which corresponds to the temporary increase in drum diameter due to heat, there is no adjustment of the plunger length so that the factor of drum temperature is effectively discounted from the adjustment.

In both embodiments the adjustment is such that always sufficient clearance exists between the brake drum and brake shoe lining. In other words, when adjustment occurs because of brake drum expansion due to heat accumulation the clearance will still be such that the brake shoes will not drag when the brake drum cools off and retracts.

Accomplished dynamometer tests showed that the present automatic brake adjusters performed excellently under normal and adverse conditions. It did not over-adjust under conditions due to high drum temperatures and distortion. There were no high localized stresses present to cause excessive wear or possible failure. It maintains always a sufficient running clearance and adjust rapidly to maintain this clearance even under rapid lining wear conditions.

Thus, there has been provided a simplified automatic brake adjuster for plunger or piston operated brakes composed of a minimum number of parts, which can be inexpensively manufactured and easily assembled and installed as original equipment or attached to brakes already in operation.

A particular novel feature of the invention is the structure whereby the nut member as at 54 is disposed in the plunger as at 30 slidably mounted in the actuator housing and the seal as at 74 completes enclosure of the plunger end and adjustment mechanism. Also of importance is that the coacting teeth on the nut and pawl are arranged at such a back angle that they are permitted to disengage in case of overload between them caused by backlash, which prevents stripping of the teeth and resultant failure of the adjuster.

The present invention may be embodied in other specific forms without departing from the essential characteristics or spirits thereof, the present embodiment to be considered in all respects as illustrative only and not restrictive, the scope of the invention being indicated by the appended claims rather than by the foregoing description.

We claim:

1. In a vehicle brake of the type characterized by a movably mounted brake shoe having a lining adapted to frictionally engage a relatively rotatable drum, return spring means normally urging the shoe to drum engaged position and a movably mounted actuator, the provision of an automatically adjustable motion transmitting means in the form of a slidably mounted plunger assembly having a first member non-rotatably connected to the shoe, a slidably mounted second member operatively connected to said actuator and an intermediate member shiftable with and rotatably mounted on said second member and so connected to said first member that rotation of said intermediate member in one direction will shift said first member toward said shoe, said motion transmitting means being separate from the actuator and disposed between the actuator and the shoe for transmitting movement of the actuator in one direction to movement of the shoe in the drum engaging direction, said motion transmitting means also determining the drum disengaged position of the shoe, and means effective when said actuator has displaced said plunger assembly more than a predetermined distance in applying the brake shoe to said drum connected to rotate said intermediate member in said one direction for actuating said intermediate member to effect relative longitudinal displacement of said first and second members for automatically expanding said plunger assembly length in accord with wear on said lining so that as the lining wears the plunger assembly is correspondingly elongated and the return position of said brake shoe is reset to maintain adequate and substantially predetermined clearance between the lining and the drum.

2. In the vehicle brake assembly defined in claim 1, said intermediate plunger member having threaded engagement with said first member, and said adjustment actuating means comprising a ratchet toothed section on said intermediate member and an associated spring biased pawl that cooperatively engages said toothed section.

3. In the vehicle brake assembly defined in claim 1, said intermediate plunger member being a sleeve having internal threaded engagement with said second member, and said adjustment actuating means comprising ratchet teeth on said sleeve and a coacting spring biased pawl that engages said ratchet teeth.

4. In a vehicle brake assembly having a support, a motion transmitting plunger adapted for transmitting motion between an actuator and a brake shoe comprising a longitudinally slidable outer member on said support, a ratchet member slidably and rotatably mounted on said outer member, a spring biased pawl extending into toothed engagement with said ratchet member, and a brake shoe end mounting member threadedly connected to said ratchet member.

5. In a vehicle brake assembly, a support, a movable mounted brake shoe on the support carrying a drum engaging lining, return spring means for normally urging the shoe to drum disengaged position, a movably mounted actuator, a slidable motion transmitting plunger assembly on the support extending between the shoe and the actuator, said plunger assembly comprising an outer member slidably mounted on said support and operably connected to said actuator, a sleeve rotatable within said outer member and having ratchet teeth on its outer periphery, and an inner member rotatably threaded in said sleeve, and means for automatically relatively longitudinally moving said inner and outer members to extend the length of the plunger assembly when the plunger assembly movement in brake applying direction exceeds a predetermined amount and to positively maintain such adjustment of said members comprising a pawl on said support engaged with said ratchet teeth and adapted to rotate said sleeve upon return movement of the shoe from the brake applying direction only when said actuator moves said plunger assembly more than said predetermined amount.

6. In a vehicle brake assembly, a support, a movably mounted brake shoe on the support carrying a drum engaging lining, return spring means for normally urging the shoe to drum disengaged position, a movably mounted actuator, a slidable motion transmitting plunger assembly on the support extending between the shoe and the actuator, said plunger assembly comprising two members connected for relative rotation and relative longitudinal movement whereby rotation of the one member will relatively longitudinally displace the other member, said one member operably connected to the actuator and the other member being operably connected to the shoe, and means for automatically relatively longitudinally moving said members to extend the length of the plunger assembly only whenever the plunger assembly movement in the brake applying direction exceeds a predetermined amount and to positively maintain such adjustment of said members comprising peripheral ratchet teeth on said one member and a pawl on said support engaging said teeth.

7. In a vehicle brake assembly, a support, a movably mounted brake shoe on the support carrying a drum engaging lining, return spring means for normally urging the shoe to drum disengaged position, a movably mounted actuator, a slidable motion transmitting plunger assembly on the support extending between the shoe and the actuator, said plunger assembly comprising two members connected for relative rotation and relative longitudinal movement whereby rotation of one member will relatively longitudinally displace said members, said one member being operably connected to the actuator and the other member being operably connected to the shoe, and means for automatically relatively longitudinally moving said members to extend the length of the plunger assembly only whenever the plunger assembly movement in the brake applying direction exceeds a predetermined amount and to positively maintain such adjustment of said members comprising longitudinally extending ratchet teeth on one of said members and a coacting rotatable pawl disposed between the support and said one member and engaging said teeth.

8. In a vehicle brake assembly having a support, a motion transmitting plunger adapted for transmitting motion between an actuator and a brake shoe comprising a longitudinally slidable outer member on said support, a ratchet member slidably and rotatably mounted on said outer member, a spring biased pawl extending into toothed engagement with said ratchet member, and a brake shoe end mounting member threadedly connected to said ratchet member, said support being a fixed housing within which said actuator is reciprocable and engaged with said outer member, said ratchet member being disposed in a central bore in said outer member, and said brake shoe engaging member being mounted in an internally threaded bore of said ratchet member.

9. In a vehicle brake assembly having a support, a motion transmitting plunger adapted for transmitting motion between an actuator and a brake shoe comprising a longitudinally slidable outer member on said support, a ratchet member having helical teeth about its periphery slidably and rotatably mounted on said outer member, a spring biased pawl mounted on said housing for radial movement relative to said ratchet member and extending into toothed engagement with said ratchet member through a side recess in said outer member, and a brake shoe end mounting member threadedly connected to said ratchet member, said support being a fixed housing within which said actuator is reciprocable and engaged with said outer member, said ratchet member being disposed in a central bore in said outer member, and said brake shoe engaging member being mounted in an internally threaded bore of said ratchet member.

10. In a vehicle brake assembly having a support, a motion transmitting plunger adapted for transmitting motion between an actuator and a brake shoe comprising a longitudinally slidable outer member on said support, a ratchet member having a longitudinal series of ratchet teeth on its periphery slidably and rotatably mounted on said outer member, a spring biased pawl extending into toothed engagement with said ratchet member, and a brake shoe end mounting member threadedly connected to said ratchet member, said support being a fixed housing within which said actuator is reciprocable and engaged with said outer member, said ratchet member being disposed in a central bore in said outer member, said pawl being a toothed element that is disposed rotatably in an annular peripheral recess on said outer plunger member and said brake shoe engaging member being mounted in an internally threaded bore of said ratchet member.

11. In the brake shoe assembly defined in claim 10, said ratchet member and pawl having coacting inclined spiral teeth adapted to disengage in case of overload as from backlash between the teeth.

12. In a vehicle brake assembly having a support, a motion transmitting plunger adapted for transmitting motion between an actuator and a brake shoe comprising a longitudinally slidable outer member on said support, a ratchet member slidably and rotatably mounted on said outer member, a spring biased pawl extending into toothed engagement with said ratchet member, a brake shoe end mounting assembly comprising a stud threadedly connected to said ratchet member, and a brake shoe retainer rotatably mounted in said stud and non-rotatably connected to said shoe, and a spring biased ratchet connection between said retainer and said stud.

13. In the vehicle brake assembly defined in claim 12, said stud being threaded into a central bore in said ratchet member and having an enlarged head outside said ratchet member, said head being formed with a manual adjustment rim.

References Cited in the file of this patent

UNITED STATES PATENTS

| | | |
|---|---|---|
| 1,968,667 | White | July 31, 1934 |
| 1,971,643 | De Lavaud | Aug. 28, 1934 |
| 2,100,488 | Rasmussen | Nov. 30, 1937 |
| 2,175,446 | Rasmussen | Oct. 10, 1939 |
| 2,184,683 | Shuman | Dec. 26, 1939 |
| 2,527,126 | Goepfrich et al. | Oct. 24, 1950 |
| 2,856,037 | Anop | Oct. 14, 1958 |
| 2,904,137 | Reisch | Sept. 15, 1959 |

UNITED STATES PATENT OFFICE
CERTIFICATE OF CORRECTION

Patent No. 3,068,964                          December 18, 1962

William J. Williams et al.

It is hereby certified that error appears in the above numbered patent requiring correction and that the said Letters Patent should read as corrected below.

Column 6, line 30, for "engaged" read -- disengaged --.

Signed and sealed this 24th day of September 1963.

(SEAL)
Attest:

ERNEST W. SWIDER                          DAVID L. LADD
Attesting Officer                           Commissioner of Patents